Patented Jan. 9, 1940

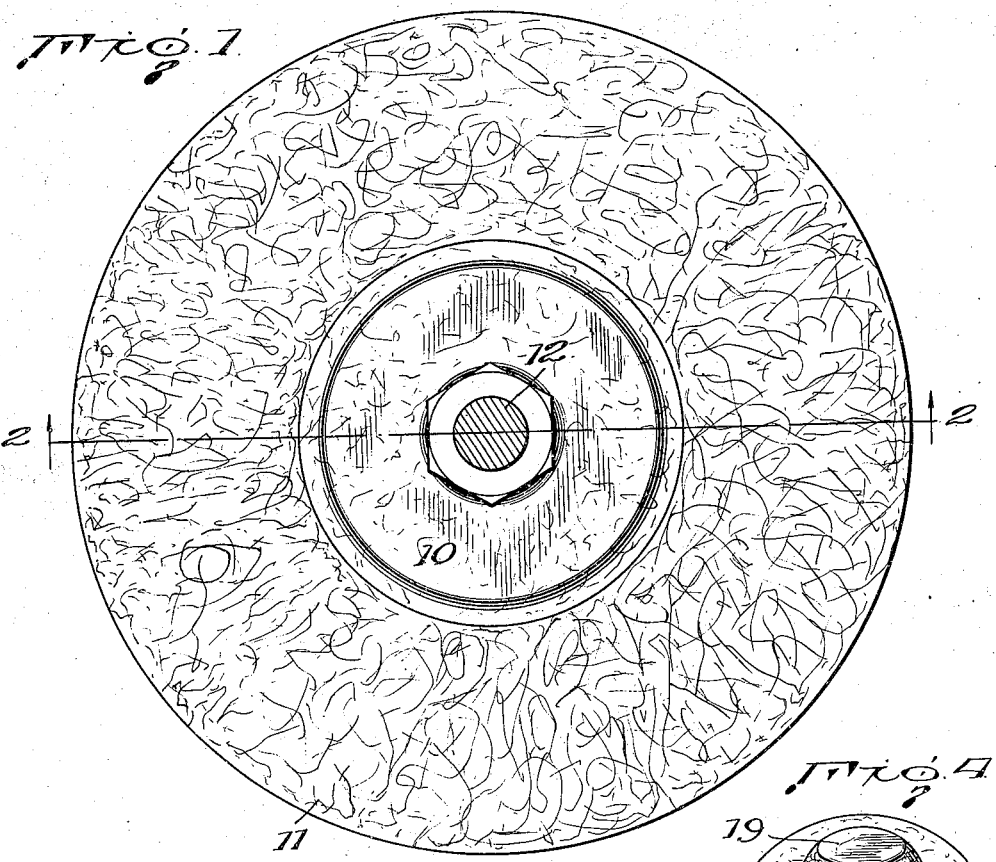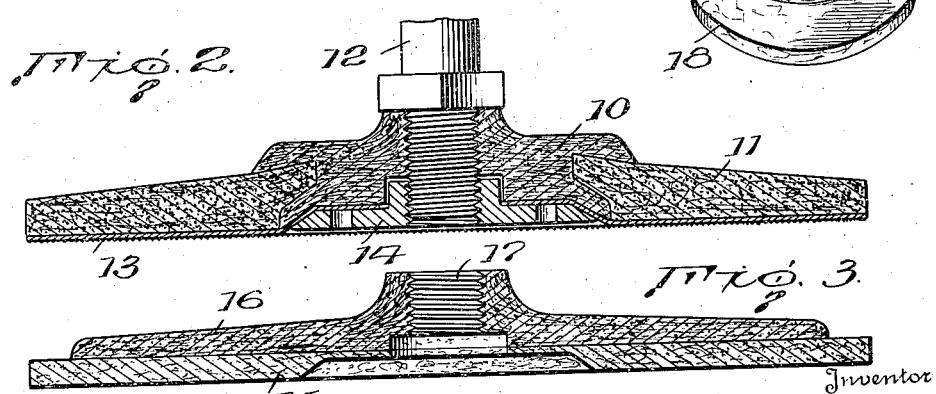

2,186,402

UNITED STATES PATENT OFFICE 2,186,402

COMPOSITE PARTI-RESILIENT BODY

Kenneth H. Bowen, Auburn, N. Y., assignor to Columbian Rope Company, Auburn, N. Y., a corporation of New York Application July 31, 1939, Serial No. 287,639

15 Claims. (Cl. 51—195)

This invention relates to improvements in molded, composite bodies.

The primary object of the invention is to provide a molded body or member having different characteristics in contiguous portions thereof due to differences in the bonding materials used in the respective portions.

A further object is to firmly bond together and unite those portions having different bonding materials notwithstanding the latter possess certain different properties or characteristics.

Another object is to provide a body having a rigid section and a resilient section, the body in its entirety being such that it can be produced in a single molding operation, thus facilitating, and reducing the cost of, production of such bodies.

A further object of the invention is to provide a molded fibre body or member comprising a substantially rigid portion wherein the fibre is impregnated with a thermo-setting binder or, if desired, a thermoplastic binder, and a flexible portion secured thereto wherein the fibre is impregnated with a resilient binder. These two different portions may be secured together by the setting of the two binders, although a mechanical interlock may also be used for securing the two portions together.

More specifically, the invention contemplates a composite molded body or member comprising a rigid portion and a flexible or resilient portion, the rigid portion preferably consisting of a fibre filler and a phenol resin binder of the heat-hardening type, and the flexible portion consisting of a fibre filler and a flexible binder such as latex cement. The two binders should be capable of setting and bonding the two different portions of the member or body securely together but, if desired, the two portions can be mechanically interlocked into one another to secure them together.

Another object of the invention is to provide an abrading pad, one portion of which is substantially rigid and another portion of which possesses flexibility or resiliency. Where the pad is to be used for polishing, it is preferred that the flexible portion take the form of an annular member surrounding a hub portion which is substantially rigid and capable of being formed with a threaded aperture for mounting on an actuating shaft. Where the pad is to be used as a floor sander, the flexible portion and the rigid portion are of disc-like formation, laid one upon the other, the rigid portion forming a backing for the flexible portion and being capable of being apertured and threaded for mounting on a shaft.

A still further object is to provide a composite molded body capable of absorbing or dampening vibrations or shocks, said member consisting of substantially rigid portions of the nature described, with an interposed flexible portion of the character above set forth, whereby the tendency of the rigid portions to move toward one another will flex the flexible portion and thus absorb or dampen impacts which tend to move the separated rigid portions toward one another.

With these and other objects in view, the invention consists in certain details of construction and combinations and arrangements of parts, all as will hereinafter be more fully described, and the novel features thereof particularly pointed out in the appended claims.

In the accompanying drawing—

Figure 1 is a plan view of a polishing pad made in accordance with the present invention;

Fig. 2 is a transverse sectional view on the line 2—2 of Fig. 1;

Fig. 3 is a view similar to Fig. 2, illustrating a floor sanding pad;

Fig. 4 is a perspective view of a shock or vibration dampening member made in accordance with the present invention; and Fig. 5 is a transverse sectional view of the vibration dampener.

In view of difficulties heretofore encountered in securing cohesion between metal and rubber by bonding the rubber to the metal, it has generally been the practice to plate the metal with copper or brass. In fact, in the absence of the plating step, it has been deemed practically impossible to bond rubber to metal so that the two will properly adhere to one another. I have discovered, however, that certain bonding materials, although possessing certain different characteristics, can be bonded together to firmly unite portions of a body or member possessing characteristics, depending upon the varying properties of the bonding materials used. In view of this, I have produced various molded bodies comprising substantially rigid portions and other flexible portions, the rigid portions being composed of a fibre filler and a thermo-setting binder, or a thermo-plastic binder, and the flexible portion being composed of a fibre filler and a flexible binder such as latex cement. Preferably, a phenol-formaldehyde resin binder of the heat-hardenable type is used in the rigid portions, although good results have been obtained with the use of thermo-plastic binders, such as cellulose acetate, ethyl cellulose and similar plastic materials. In molding a body under pressure and heat, the fibre impregnated with the phenol resin binder becomes very rigid and is well capable of being machined. On the other hand, the latex cement retains its property of resiliency upon the application of such heat and pressure as is used in setting the phenol resin binder. Thus, that portion of the body composed of the fibre filler and latex cement binder possesses a high degree of flexibility or resiliency. At the same time, it will be found that the two binders have so fused together that when set under heat and pressure the two portions of the body are rather firmly secured together by the bonding action of those bonding materials.

For instance, as illustrated in Figs. 1 and 2, a polishing pad can be produced from two such bodies of fibres impregnated with bonding materials of different natures. In the case of the polishing pad, there is a hub portion 10 formed of a fibre filler, preferably vegetable fibres, and a phenol resin or thermo-setting binder, and surrounding said hub portion there is an annular peripheral portion 11 formed of fibre, also preferably vegetable fibre, and a latex cement binder. Preferably, in molding this pad, a number of plies or thicknesses of the material, which are to constitute the hub, and which are in the form of discs, are placed in the mold and then the required number of thicknesses of the material, which are to constitute the annular portion 11, are placed in the mold. Each of these thicknesses forming the annular portion 11 is in the form of an annulus having a bore less than the diameter of the discs constituting the hub. Thus, the inner edges of the plies of material constituting the peripheral portion 11 overlap the edges of the discs which are to form the hub. After this, additional thicknesses of material constituting the hub are placed in the mold with the edges of the upper thicknesses overlapping the exposed surface of the inner edge of the material which is to constitute the peripheral portion 11. In other words, the plies of material constituting the peripheral portion 11 are interfitted between upper and lower plies which are to constitute the hub portion 10. The loaded mold is then subjected to pressure and heat, in accordance with usual molding practices, to form the pad illustrated, in section, in Fig. 2. As will be seen, the inner edge of the annular peripheral portion 11 is interfitted or interlocked, so to speak, with the top and lower portions of the hub 10, due to the manner in which the mold was loaded with the several thicknesses of the two materials. This mechanical interlock might well be relied upon for securing the two sections together because the pressure used in the molding firmly secures the interfitting portions together.

As previously stated, the setting of the phenolic resin binder by the application of pressure and heat produces a very strong rigid and hard hub. As illustrated, this hub is formed with a threaded aperture to receive the threaded end of a shaft 12 for rotating the pad. The aperture may be formed in the hub during the molding operation or later, preliminarily to the threading operation. The operative face of the pad is adapted to be provided with an abrading surface. For instance, it may be provided with a sheet of emery paper or sand paper 13. When mounted on the hub, this sheet of abrading material is held in place by the nut 14 which also secures the pad on the threaded end of shaft 12.

While the hub portion 10 is very strong and hard, the peripheral annular portion 11 possesses the desired resiliency in that, when placed in operation with the hub disposed at an angle to the surface being polished, the peripheral portion can bend or flex backwardly. At the same time, it will be found that the hub portion and peripheral portion are firmly secured together mechanically as well as by the bonding action of both the latex cement in the peripheral portion 11 and the phenolic resin binder in the hub portion 10. As previously stated, the interfitting relationship of the hub portion and peripheral portion may, alone, be relied upon for maintaining the unitary arrangement of the two sections. It will be obvious that this interfitting relationship is not necessarily limited to the inner edge of the peripheral portion extending into the recess formed in the perimeter of the hub portion as the several laminations might well be placed in the mold in such fashion as to have the material constituting the hub project in between plies of material constituting the annular portion 11.

In the case of the floor sanding pad, the operative face of the pad should be backed or reinforced throughout substantially its entire area as it is applied more or less flat against the surface of the floor. Consequently, in molding these pads, a number of discs of fibre impregnated with latex cement are first placed in the mold and then the desired number of thicknesses of fibre impregnated with the phenolic resin binder are superimposed thereon in the mold, after which heat and pressure are applied to the mold, as above outlined in connection with the molding of the polishing pad. The operative face of the floor sanding pad, formed of fibre and latex cement binder, constitutes the resilient or flexible portion 15 of the body, and this flexible portion is backed, so to speak, by the rigid portion 16, which is formed of fibre and the phenolic resin binder, the operative portion and the backing portion being usually of the same circular dimension. In this instance, it will also be noted that the backing portion 16 is provided with an aperture 17 therein and the wall of said aperture threaded for mounting the pad on its actuating shaft. Here, again, the two portions—the resilient portion 15 and the substantially rigid backing portion 16—are securely united over their entire contacting surfaces by the bonding properties of both the latex cement binder and the phenolic resin binder.

In the vibration dampener illustrated in Figs. 4 and 5, the composite member is formed of a substantially rigid base portion 18 and a substantially rigid top portion 19 held in spaced relationship with respect to the base 18 by an intermediate resilient, flexible portion 20. Both the base 18 and the top 19 are formed of fibre impregnated with phenolic resin binder. In the structure actually shown in Figs. 4 and 5, the base 18 and top 19 are preferably in the form of an annulus and a disc, respectively. On the other hand, the intermediate flexible portion 20 is formed of the fibre impregnated with the flexible binder such as latex cement and when the entire composite body is molded under pressure and heat, these several portions are securely bonded together by the action of these bonding materials. In use, one of the portions 18 or 19, but usually the base 18, will be mounted upon a firm support and the other portion, in this instance the top 19, is adapted to receive the impacts or shocks that are to be absorbed or dampened. Such shocks or impacts will be absorbed by the intermediate flexible portion 20 by reason of the flexing of this portion each time there is a tendency of the top 19 to move toward the base 18.

While the latex cement binder is preferred for impregnating the resilient portions of composite bodies made in accordance with the present invention, it is also possible to use certain types of resin binders. There are, at present, on the market, flexible or plasticized resin binders, which can be utilized in the flexible portions of the composite member. Thus, the resin binders of this last-mentioned type do not impart rigidity to the impregnated fibres that are to constitute the flexible portions of the composite molded body.

What I claim is:

1. A composite body having a rigid portion consisting of a fibre filler impregnated with a thermo-setting binder and a flexible portion consisting of a fibre filler and a flexible binder, said two portions being securely bonded together by said binders.

2. A composite body having a rigid portion composed essentially of a fibre filler and a phenol resin binder of the heat-hardening type and a resilient portion consisting essentially of a fibre filler impregnated with a latex cement binder, said two portions being securely bonded together by said binders.

3. A composite body composed essentially of a fibre filler and binder material, one portion of said body being impregnated with a phenolic resin binder of the heat-hardening type and a second portion impregnated with a flexible resin binder set by baking, said two portions being firmly secured in said body by the bonding action of their binders.

4. A composite body having a rigid section consisting of a fibre filler impregnated with a binder which becomes rigid when set and a flexible section consisting of a fibre filler and a flexible binder, portions of the two sections being mechanically interlocked with one another.

5. A composite body having a rigid section consisting of a vegetable fibre filler impregnated with a thermo-plastic binder which becomes rigid when set and a flexible section consisting of a vegetable fibre filler and a resilient binder, portions of said two sections being mechanically interlocked with one another.

6. An abrading pad composed of fibre filler and binder material, and having a hard, rigid hub section encircled by a flexible annular peripheral section, portions of said two sections being mechanically interlocked with one another.

7. An abrading pad composed of a rigid hub section formed of a fibre filler and phenolic resin binder and a flexible peripheral portion encircling said hub section, said peripheral portion being formed of a fibre filler and a resilient binder, and a mechanical interlock firmly uniting said hub section and peripheral portion.

8. An abrading pad having a rigid hub section formed of fibres and a thermo-setting binder and a hub-encircling, flexible peripheral section formed of fibres and a resilient binder, the fibres of one section being arranged in plies with the edges of plies of said section overlapping the other section to secure the two sections together.

9. An abrading pad having a rigid hub section formed of fibres and a thermo-setting binder and a hub-encircling, flexible peripheral section formed of fibres and a resilient binder, the fibres of each section being arranged in plies with plies of one section projecting between plies of the other section to form a mechanical interlock between the two sections.

10. An abrading pad formed of a substantially rigid portion and a flexible, resilient portion, said rigid portion being composed of a fibre filler impregnated with a phenol resin binder of the heat-hardening type and said flexible portion being formed of a fibre filler and a flexible binder, the two portions being securely attached by the bonding action of their binders.

11. An abrading pad having a substantially rigid central hub portion with an aperture formed axially thereof, the wall of said aperture being threaded for attachment to an actuating shaft, and a flexible peripheral portion surrounding said hub portion, the perimeter of said hub portion and the inner edge of said peripheral portion being arranged in overlapping relationship, each of said portions being formed of a fibre filler and a binder, the overlapping areas of the two sections being securely attached together by the bonding action of the binder material therein.

12. A floor sanding pad comprising a resilient working face portion formed of a fibre filler and a resilient binder and a backing for said working portion formed of a fibre filler and a phenol resin binder of the heat-hardening type, said working portion and backing being firmly secured together by the binder materials carried thereby.

13. A floor sanding pad comprising a resilient working face portion formed of a fibre filler and a resilient binder and a backing for said working portion formed of a fibre filler and a phenol resin binder of the heat-hardening type, said working portion and backing being firmly secured together by the binder materials carried thereby, and said backing having a threaded aperture therein for mounting on a shaft.

14. A composite shock absorbing member composed of a resilient body of fibre filler and resilient binder interposed between substantially rigid bodies of fibre impregnated with a phenol resin binder of the heat-hardening type, all of said bodies being firmly united in said member by said binder materials.

15. A composite shock absorbing member composed of a substantially rigid annulus formed of a fibre filler and a phenol resin binder of the heat-hardening type, a substantially rigid disc of fibre filler and a like binder, and a resilient body of fibre filler and a rubber cement binder interposed between said annulus and disc, said annulus, disc and resilient body being firmly united in said member by said binder materials.

KENNETH H. BOWEN.